United States Patent
Kunz et al.

(10) Patent No.: US 12,423,697 B1
(45) Date of Patent: Sep. 23, 2025

(54) DECENTRALIZED SYSTEMS AND METHODS FOR RESPONSE GENERATION TO API CALLS

(71) Applicant: 1inch Limited, Tortola (VG)

(72) Inventors: Sergej Kunz, Stuttgart (DE); Anton Bukov, Amstelveen (NL)

(73) Assignee: 1inch Limited, Tortola (VG)

( * ) Notice: Subject to any disclaimer, the term of this patent is extended or adjusted under 35 U.S.C. 154(b) by 0 days.

(21) Appl. No.: 19/086,741

(22) Filed: Mar. 21, 2025

Related U.S. Application Data

(63) Continuation of application No. 19/079,026, filed on Mar. 13, 2025.

(60) Provisional application No. 63/566,109, filed on Mar. 15, 2024.

(51) Int. Cl.
*G06Q 20/40* (2012.01)
*G06F 9/54* (2006.01)
*G06Q 20/38* (2012.01)

(52) U.S. Cl.
CPC .......... *G06Q 20/401* (2013.01); *G06F 9/547* (2013.01); *G06Q 20/389* (2013.01)

(58) Field of Classification Search
None
See application file for complete search history.

(56) References Cited

U.S. PATENT DOCUMENTS

| | | |
|---|---|---|
| 6,422,373 B1 | 7/2002 | Yellop et al. |
| 11,123,456 B2 | 9/2021 | Masinaei et al. |
| 11,234,567 B2 | 2/2022 | Thorne et al. |
| 11,456,789 B2 | 9/2022 | Hou et al. |
| 11,544,786 B2 | 1/2023 | Diamond |
| 11,567,890 B2 | 1/2023 | Bussing et al. |
| 11,678,901 B2 | 6/2023 | Scoggins et al. |
| 11,789,012 B2 | 10/2023 | Janes et al. |
| 11,890,123 B2 | 2/2024 | Boone et al. |
| 12,099,978 B2 | 9/2024 | Bukov et al. |
| 12,277,536 B2 | 4/2025 | Dominique et al. |
| 2003/0200439 A1 | 10/2003 | Moskowitz |
| 2008/0264043 A1 | 10/2008 | Kawakita et al. |
| 2010/0235277 A1 | 9/2010 | Van et al. |

(Continued)

OTHER PUBLICATIONS

Anonymous: "1inch.io", Jan. 4, 2023, XP093135078, Retrieved from the Internet on Feb. 26, 2024: URL:http://1inch.io.

(Continued)

*Primary Examiner* — Jamie R Kucab
(74) *Attorney, Agent, or Firm* — Perkins Coie LLP

(57) ABSTRACT

The present disclosure provides a system for decentralized handling of application programming interface (API) calls. The system comprises a peer-to-peer network including a plurality of nodes, each node being a user device, a relayer, or a resolver. Each node includes at least one hardware processor and at least one non-transitory memory storing instructions. When executed, the instructions cause the node to receive an encrypted API request from a user device, forward the encrypted API request to at least one resolver node, process the API request to generate an API response, and transmit the API response back to the user device. The peer-to-peer network may comprise a mesh network and utilize a Remote Procedure Call (RPC) architectural style. The system enables decentralized management of API calls without relying on centralized servers.

20 Claims, 8 Drawing Sheets

(56) References Cited

U.S. PATENT DOCUMENTS

| | | |
|---|---|---|
| 2013/0157711 A1 | 6/2013 | Lee et al. |
| 2014/0040114 A1 | 2/2014 | Baumgart et al. |
| 2014/0289163 A1 | 9/2014 | Michaud et al. |
| 2018/0352033 A1* | 12/2018 | Pacella ............... H04L 9/3239 |
| 2019/0349261 A1* | 11/2019 | Smith ................... H04L 69/18 |
| 2019/0373521 A1* | 12/2019 | Crawford ...... H04W 36/008355 |
| 2019/0379595 A1 | 12/2019 | Ur et al. |
| 2019/0385156 A1 | 12/2019 | Liu |
| 2019/0392511 A1 | 12/2019 | Mahajan et al. |
| 2020/0082025 A1 | 3/2020 | Zhou et al. |
| 2020/0104835 A1 | 4/2020 | Day et al. |
| 2020/0119925 A1 | 4/2020 | Wang |
| 2021/0035246 A1 | 2/2021 | Schouppe et al. |
| 2021/0073913 A1 | 3/2021 | Ingargiola |
| 2021/0352142 A1 | 11/2021 | Jayaram et al. |
| 2022/0126438 A1 | 4/2022 | Cristache |
| 2023/0198886 A1 | 6/2023 | Ur et al. |
| 2023/0206329 A1 | 6/2023 | Cella et al. |
| 2023/0267456 A1 | 8/2023 | Garner et al. |
| 2023/0385822 A1 | 11/2023 | Shanmugam et al. |
| 2024/0273486 A1 | 8/2024 | Bukov et al. |
| 2024/0273487 A1 | 8/2024 | Bukov et al. |
| 2024/0420227 A1 | 12/2024 | Bukov et al. |
| 2024/0428209 A1 | 12/2024 | Bukov et al. |
| 2025/0165937 A1 | 5/2025 | Bukov et al. |

OTHER PUBLICATIONS

Benligiray et al., "Decentralized APIs for Web 3.0", api3.org, Jan. 9, 2024, pp. 1-40.

Breidenbach et al., "Chainlink 2.0: Next Steps in the Evolution of Decentralized Oracle Networks", Retrieved from the Internet: URL:https://research.chain.link/whitepaper-v2.pdf, Apr. 15, 2021, pp. 1-136.

Fang Lucius et al.: "How to DEFI (Advanced)", May 31, 2021, pp. 1-290, XP055960691, ISBN: 9798530318443, Retrieved from the Internet on Feb. 27, 2024: URL:https://cp0x.com/applications/core/interface/file/attachment.php?id=1653&key=fca3e1489485ef25c33f83d8636fd16b.

International Search Report and Written Opinion received for PCT Patent Application No. PCT/IB25/052695, mailed on May 27, 2025, 15 pages.

Patent Application as filed of U.S. Appl. No. 18/408,376, filed Jan. 9, 2024, 81 pages.

Xu, J. et al., "SoK: Decentralized Exchanges (DEX) with Automated Market Maker (AMM) protocols" Arxiv.Org, Cornell University Library, Apr. 19, 2021, XP081930404.

Xue, Y. et al., "Invited Paper: Fault-tolerant and Expressive Cross-Chain Swaps", arxiv.org, Cornell University Library, Nov. 1, 2022, XP091357638.

* cited by examiner

DECENTRALIZED SYSTEMS AND METHODS FOR RESPONSE GENERATION TO API CALLS

RELATED APPLICATIONS

The present application is a continuation of U.S. patent application Ser. No. 19/079,026, filed Mar. 13, 2025, which claims the benefit under 35 U.S.C. § 119(e) of U.S. Provisional Application No. 63/566,109, filed Mar. 15, 2024, each of which is hereby incorporated herein by reference in its entirety under 37 C.F.R. § 1.57. Any and all applications for which a foreign or domestic priority claim is identified in the Application Data Sheet as filed with the present application are hereby incorporated by reference under 37 C.F.R. § 1.57.

TECHNICAL FIELD

The embodiments of the disclosure generally relate to handling API calls using a decentralized, peer-to-peer network instead of an API server (e.g., as part of a client-server architecture).

BACKGROUND

Application programming interfaces (APIs) are sets of rules, protocols, or tools that let software applications communicate with each other to exchange data, features, and functionality. APIs enable software applications to perform specific actions involving other applications, and they also enable developers to access functionality and data from external services or software without having to understand or integrate the complex underlying codebase. For example, an API for a first application may define a collection of actions, requests, and responses (and the structure for those requests and responses) that developers of a second application can access, and the developers of the second application may use this API to enable the second application to communicate and share information with the first application. API architecture typically follows a client-server architecture, in which the application sending a request (e.g., an API call) may be referred to as the client and the application sending the response may be referred to as the server.

In recent years, decentralized computing, platforms, and network protocols have been rapidly gaining in popularity. For example, decentralized computing is now commonly associated with the use of blockchain technology. A blockchain is a distributed ledger with growing lists of records (blocks) that are securely linked together via cryptographic hashes. The blockchain can be managed by a peer-to-peer (P2P) computer network for use as a public distributed ledger, and nodes of the network collectively adhere to a consensus algorithm protocol to add and validate new transaction blocks. The pairing of decentralized computing and blockchain technology has given rise to new transaction ecosystems such as decentralized finance (DeFi), which offers transactions of financial instruments without relying on intermediaries such as brokerages, exchanges, or banks by using smart contracts on a blockchain. Notably, the pairing of decentralized computing and blockchain technology has also given rise to new software paradigms such as decentralized applications (dApps), which are a type of distributed, open-source software application that run on a peer-to-peer (P2P) blockchain network rather than on a single computer.

However, an application may still rely on the use of an API to communicate with, or obtain information from, another application or source. This has resulted in a centralization concern tied to using the typical client-server API architecture for handling API calls. Although the dApp itself may be decentralized and not owned by any single entity, the dApp could make an API call that is handled and responded to by a single, centralized source. Although the dApp itself may be decentralized and not owned by any single entity, the dApp could make an API call that is handled and responded to by a single, centralized source. This can potentially lead to trust issues surrounding a single point of failure, which decentralization is intended to address.

Accordingly, there exists a need for addressing the centralization associated with API architecture, such as using a decentralized and secure approach for handling API calls, so that software applications can interact with each other and exchange data in a decentralized manner. This would enable the creation of dApps that are not reliant on client-server API architecture and that can exchange data in a completely decentralized manner, thereby improving the degree of decentralization exhibited by the dApps.

SUMMARY

For purposes of this summary, certain aspects, advantages, and novel features are described herein. It is to be understood that not necessarily all such advantages may be achieved in accordance with any particular embodiment. Thus, for example, those skilled in the art will recognize the disclosures herein may be embodied or carried out in a manner that achieves one or more advantages taught herein without necessarily achieving other advantages as may be taught or suggested herein.

All of the embodiments described herein are intended to be within the scope of the present disclosure. These and other embodiments will be readily apparent to those skilled in the art from the following detailed description, having reference to the attached figures. The invention is not intended to be limited to any particular disclosed embodiment or embodiments.

Systems and methods for decentralized handling of API calls are disclosed herein. In some embodiments, a peer-to-peer network comprising a set of nodes may be used to enable API calls to be handled in a completely decentralized manner. In some embodiments, the set of nodes may collaborate in proxying and serving data, exchange information privately, rely on consensus to verify the correctness of executed tasks, and use a proprietary payment channel technology to receive rewards for handling user requests.

Some implementations described here are directed to a system for generating a decentralized response to an application programming interface (API) call, the system comprising: a blockchain network comprising a relayer registration smart contract; a peer-to-peer network comprising a plurality of nodes, wherein each of the plurality of nodes comprises a relayer or a resolver, each node comprising: at least one hardware processor; and at least one non-transitory memory storing instructions, which, when executed by the at least one hardware processor, cause the node to: for at least one relayer: register on the blockchain network using the relayer registration smart contract; receive, from a user via a decentralized application, an encrypted user request on the peer-to peer network, the encrypted user request comprising the API call encrypted with a public key of at least one resolver selected through the decentralized application; validate a payment status of the decentralized application; transmit, to the at least one resolver, the encrypted user request without decrypting the encrypted user request;

receiving, from the at least one resolver, the accessed data; and transmitting the accessed data to the decentralized application; for the at least one resolver; receive, from the at least one relayer, the encrypted user request; decrypt the encrypted user request using a private key; process the API call to obtain a result; compare the obtained result to a second result obtained by at least one other resolver to reach a validation consensus; upon reaching the validation consensus, execute the API call to generate a response to the encrypted user request; and transmit, to the at least one relayer, the response to the encrypted user request.

In some implementations, the peer-to-peer network comprises a mesh network. In some implementations, the peer-to-peer network comprises a Remote Procedure Call (RPC) architectural style. In some implementations, the relayer registration smart contract comprises a decentralized autonomous organization (DAO) smart contract. In some implementations, the encrypted user request is encrypted using asymmetric cryptography. In some implementations, reaching a validation consensus comprises using a flooding consensus algorithm.

Some implementations herein are directed to a computer-implemented method for generation of a decentralized response to an application programming interface (API) call, the computer-implemented method comprising: registering at least one relayer of a plurality of relayers of a peer-to-peer network on a blockchain network using a relayer registration smart contract, wherein the peer-to-peer network comprises a plurality of nodes comprising the plurality of relayers and a plurality of resolvers; receiving, from a user via a decentralized application by the at least one relayer, an encrypted user request on the peer-to peer network, the encrypted user request comprising the API call encrypted with a public key of at least one resolver selected through the decentralized application; validating, by the at least one relayer, a payment status of the decentralized application; transmitting, by the at least one relayer to at least one resolver of the plurality of resolvers, the encrypted user request without decrypting the encrypted user request; decrypting, by the at least one resolver, the encrypted user request using a private key; processing, by the at least one resolver, the API call to obtain a result; comparing, by the at least one resolver, the obtained result to a second result obtained by at least one other resolver to reach a validation consensus; upon reaching the validation consensus, executing, by the at least one resolver, the API call to generate a response to the encrypted user request; transmitting, by the at least one resolver to the at least one relayer, the response to the encrypted user request; and transmitting the response to the encrypted user request to the decentralized application, wherein the at least one relayer and the at least one resolver comprise a processor and a memory.

In some implementations, the peer-to-peer network comprises a mesh network. In some implementations, the peer-to-peer network comprises a Remote Procedure Call (RPC) architectural style. In some implementations, the relayer registration smart contract comprises a decentralized autonomous organization (DAO) smart contract. In some implementations, the encrypted user request is encrypted using asymmetric cryptography. In some implementations, reaching a validation consensus comprises using a flooding consensus algorithm. In some implementations, executing the API call comprises executing a payment smart contract.

Some implementations herein are directed to a non-transitory computer readable medium having stored thereon instructions for causing a processing circuitry to execute a process, the process comprising: registering at least one relayer of a plurality of relayers of a peer-to-peer network on a blockchain network using a relayer registration smart contract, wherein the peer-to-peer network comprises a plurality of nodes comprising the plurality of relayers and a plurality of resolvers; receiving, from a user via a decentralized application by the at least one relayer, an encrypted user request on the peer-to peer network, the encrypted user request comprising the API call encrypted with a public key of at least one resolver selected through the decentralized application; validating, by the at least one relayer, a payment status of the decentralized application; transmitting, by the at least one relayer to at least one resolver of the plurality of resolvers, the encrypted user request without decrypting the encrypted user request; decrypting, by the at least one resolver, the encrypted user request using a private key; processing, by the at least one resolver, the API call to obtain a result; comparing, by the at least one resolver, the obtained result to a second result obtained by at least one other resolver to reach a validation consensus; upon reaching the validation consensus, executing, by the at least one resolver, the API call to generate a response to the encrypted user request; transmitting, by the at least one resolver to the at least one relayer, the response to the encrypted user request; and transmitting the response to the encrypted user request to the decentralized application, wherein the at least one relayer and the at least one resolver comprise a processor and a memory.

In some implementations, the peer-to-peer network comprises a mesh network. In some implementations, the peer-to-peer network comprises a Remote Procedure Call (RPC) architectural style. In some implementations, the relayer registration smart contract comprises a decentralized autonomous organization (DAO) smart contract. In some implementations, the encrypted user request is encrypted using asymmetric cryptography. In some implementations, reaching a validation consensus comprises using a flooding consensus algorithm. In some implementations, executing the API call comprises executing a payment smart contract.

BRIEF DESCRIPTION OF THE DRAWINGS

These and other features, aspects, and advantages of the disclosure are described with reference to drawings of certain embodiments, which are intended to illustrate, but not to limit, the present disclosure. It is to be understood that the accompanying drawings, which are incorporated in and constitute a part of this specification, are for the purpose of illustrating concepts disclosed herein and may not be to scale.

DETAILED DESCRIPTION

Figure 1:
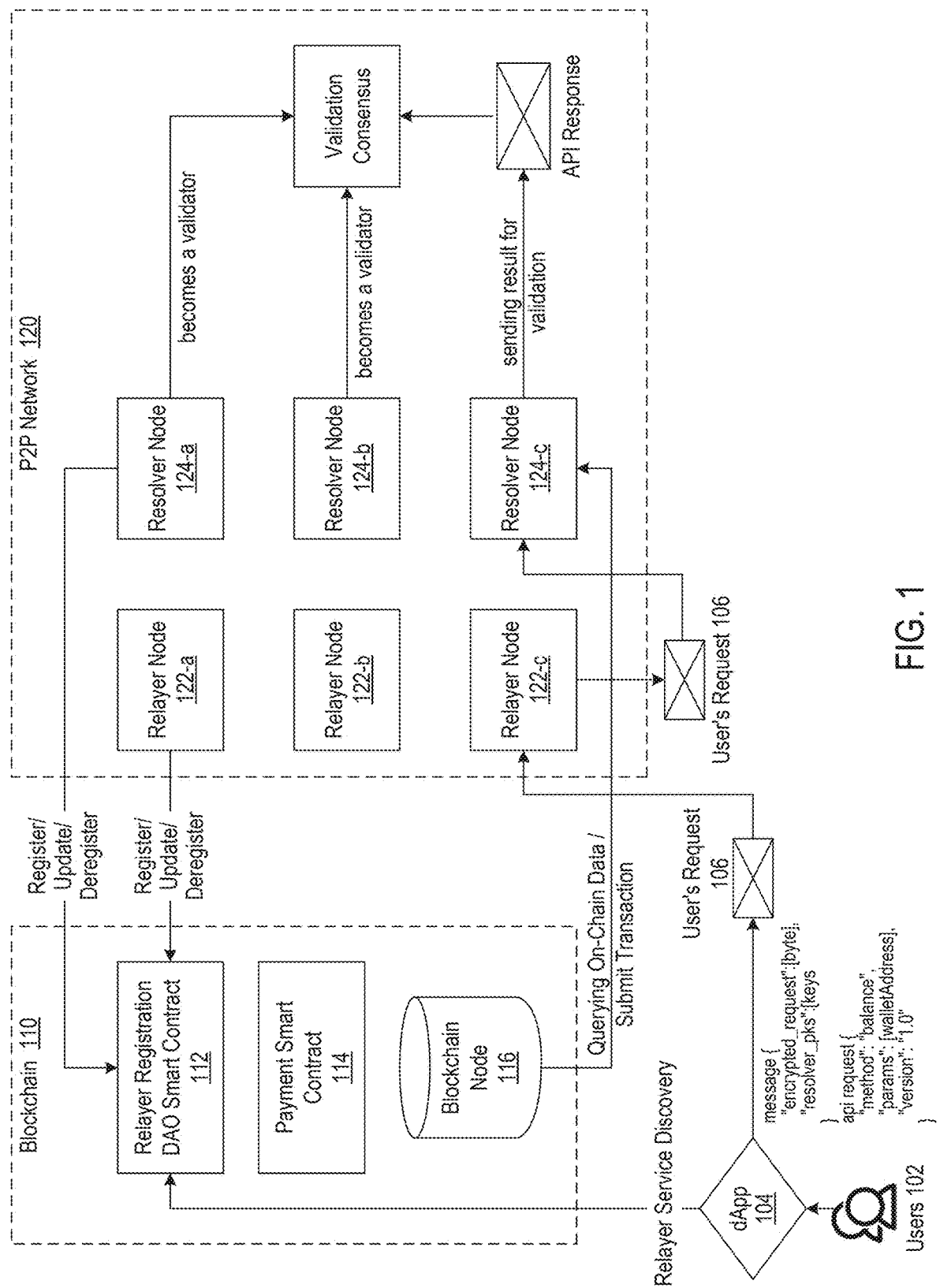
FIG. 1 illustrates a high-level component architecture of a P2P Network for the decentralized handling of API calls.

Although several embodiments, examples, and illustrations are disclosed below, it will be understood by those of ordinary skill in the art that the inventions described herein extend beyond the specifically disclosed embodiments, examples, and illustrations and includes other uses of the inventions and obvious modifications and equivalents thereof. Embodiments of the inventions are described with reference to the accompanying figures, wherein like numerals refer to like elements throughout. The terminology used in the description presented herein is not intended to be interpreted in any limited or restrictive manner simply because it is being used in conjunction with a detailed description of certain specific embodiments of the inventions. In addition, embodiments of the inventions can comprise several novel features and no single feature is solely responsible for its desirable attributes or is essential to practicing the inventions herein described.

As previously mentioned, the centralized client-server model constraint on handling application programming interface (API) calls inherently imposes limitations and issues around data control, privacy vulnerabilities, and a dependency on central points of failure. Systems and methods disclosed herein address these issues by presenting a decentralized and secure approach for handling API calls, so that software applications can interact with each other and exchange data in a decentralized manner. In some cases, decentralized handling of API calls may provide advantages over traditional centralized systems. For example, a decentralized approach for managing API calls may enable software applications to interact and exchange data without relying on a single centralized server or authority. This decentralized architecture may enhance reliability, security, and scalability compared to conventional client-server models.

A system for decentralized API call handling may comprise a peer-to-peer network of nodes. The nodes may include user devices, relayers, and resolvers. User devices may initiate API requests through decentralized applications. User requests may encompass a wide range of interactions initiated through the dApps. These requests may include API calls for data retrieval, information access, or specific operations within the peer network. Users may input data, select options, or trigger actions that generate API calls, such as querying blockchain-based smart contracts or interacting with decentralized services. The system can process requests for validation or consensus on certain operations, as well as handle transactions or operations that require interaction across the peer network. User requests may also involve identity verification, authentication processes, or participation in decentralized governance through voting mechanisms. In some implementations, users may submit requests for content delivery, access to distributed resources, or file storage and retrieval in a decentralized file system. The system is capable of managing requests related to in-game asset transactions or verifications for decentralized gaming platforms, as well as energy management or trading requests in smart grid applications. The versatility of the system allows it to accommodate various types of user requests, adapting to different use cases and functionalities implemented within the decentralized API call handling framework. Each request, regardless of its specific nature, is processed in a decentralized manner across the peer network, leveraging the system's architecture to ensure efficient, secure, and transparent handling of user interactions.

Relayers may act as intermediaries to forward encrypted requests. Resolvers may process the API calls and return results. In some implementations, the peer-to-peer network may utilize a mesh topology where nodes can communicate directly with each other. This structure may eliminate single points of failure and improve network resilience. The system may employ end-to-end encryption to protect data in transit between nodes. A decentralized discovery mechanism may be used to identify available relayers and resolvers. This may involve a blockchain-based smart contract that maintains a registry of network participants. Nodes may register their capabilities and availability through this contract.

The system may incorporate consensus mechanisms to validate API call results across multiple resolver nodes. Off-chain payment channels may be used to incentivize nodes and facilitate microtransactions for API services. By distributing API call handling across a peer network, this approach may reduce reliance on centralized infrastructure. The systems described herein improve service availability, data privacy, and censorship resistance compared to traditional API architectures. The decentralized model may enable the development of applications that can operate in a fully distributed manner.

As noted above, in some implementations, the system may be used to enable API calls to be handled in a completely decentralized manner. The system may comprise a peer-to-peer network of a set of nodes. In some embodiments, every participant benefits from being a part of this system and holds a significant role in maintaining its privacy and security.

In some embodiments, the network may be built using the event-driven Remote Procedure Call (RPC) architectural style, and the participants may include users, relayers, and resolvers. RPC is an architectural style utilized in distributed systems to facilitate the execution of a procedure in a different address space, often on a separate physical machine, as if it were a local procedure call. This abstraction allows developers to invoke remote procedures without explicitly coding the details of the remote interaction, thereby simplifying the development process. The RPC model operates on a client-server paradigm, where the client requests a service or procedure execution, and the server provides the requested service or executes the procedure. The core components of RPC include client and server stubs. The client stub represents the remote procedure on the client side, marshaling the procedure parameters into a message format suitable for transmission over the network. Conversely, the server stub receives the marshaled message, unmarshals the parameters, and invokes the actual procedure on the server. This process of marshalling and unmarshalling ensures that the data is correctly packaged and interpreted across different address spaces. RPC relies on a communication protocol, such as TCP/IP, to transmit the marshaled messages between the client and server. The procedure call can be synchronous, where the client waits for the server to complete the procedure and return the result, or asynchronous, where the client does not wait and can continue executing other tasks. This flexibility allows RPC to be adapted to various use cases and performance requirements. The steps involved in an RPC include the client program calling the client stub as if it were a local procedure, the client stub marshalling the parameters into a message, and transmitting the message to the server. Upon receiving the message, the server stub unmarshals the parameters and calls the actual procedure. The result of the procedure is then marshaled by the server stub, transmitted back to the client, and unmarshaled by the client stub, which finally returns the result to the client program. RPC offers several advantages, including transparency, as it makes remote calls appear as local calls, and modularity, by encouraging the separation of client and server functionalities. Additionally, RPC promotes interoperability, allowing different platforms and languages to communicate with appropriate stubs and protocols.

In some embodiments, the network is a mesh network with no central authority, where all devices act as nodes and communicate with each other directly and independently, without needing to go through a central access point. A mesh network is a network topology in which each node (device) is interconnected with one another, allowing for direct communication between nodes without relying on a central hub or router. This decentralized structure enhances the network's robustness, reliability, and scalability. In a mesh network, nodes can communicate with each other directly or indirectly through other nodes, creating multiple pathways for data to travel. This redundancy ensures that if one node fails or a connection is disrupted, the network can dynamically reroute the data through alternative paths, maintaining uninterrupted communication. Mesh networks can be classified into two types: full mesh and partial mesh. In a full mesh network, every node is connected to every other node, providing the highest level of redundancy and reliability. However, this configuration can be complex and costly to implement due to the large number of connections required. In contrast, a partial mesh network connects some nodes to multiple nodes, but not all, striking a balance between redundancy and cost-effectiveness. The key components of a mesh network include nodes, which can be any device capable of transmitting and receiving data, such as routers, switches, or wireless access points. These nodes work collaboratively to route data, manage network traffic, and ensure efficient communication. The network's decentralized nature eliminates the need for a central controller, distributing the network management tasks across all nodes.

Thus, instead of relying on a traditional DNS system, the network may use a decentralized discovery process through a specialized smart contract, such as a Relayer Registration DAO Smart Contract on the Ethereum blockchain. A DAO (Decentralized Autonomous Organization) smart contract is a type of blockchain-based program that codifies the rules and decision-making apparatus of an organization, creating a structure with decentralized control. This enables a trustworthy and efficient method for identifying and connecting with relayers, plus mitigates the risk of DNS spoofing and similar attacks.

FIG. 1 illustrates a high-level component architecture of a P2P Network for the decentralized handling of API calls. The system may comprise a user 102, a decentralized application 104, a blockchain network 110, and a peer network (P2P) 120. In some embodiments, the P2P network 120 is built using the event-driven Remote Procedure Call (RPC) architectural style, and the participants include users 102, relayers 122-A, 122-B, 122-C, and resolvers 124-A, 124-B, 124-C. In some embodiments, every participant benefits from being a part of this system and holds a significant role in maintaining its privacy and security.

The end user 102 is the primary actor who interacts with the decentralized network through a dApp 104. dApps 104 are responsible for user communication with the P2P Network 120, which involves encoding user actions into network-compatible requests 106, signing transactions, and managing responses from the network by interacting with relayers and resolvers. In some implementations, a user 102 may interact with a dApp 104 to initiate a user request 106. The dApp 104 may be a software application that operates on a decentralized network rather than a single computer.

The blockchain network 110 may include a registration contract 112, which may comprise, for example, a DAO smart contract, and a payment smart contract 114. In some implementations, the registration contract 112 may be used to maintain a registry of network participants. The payment contract 114 may facilitate transactions between users 102 and service providers within the system. A blockchain node 116 may be part of the blockchain network 110 and may participate in maintaining the distributed ledger.

The peer network 120 may comprise multiple nodes including relayers and resolvers. In some cases, the peer network 120 may include a first relayer 122-A, a second relayer 122-B, and a third relayer 122-C. These relayers may act as intermediaries to forward encrypted requests 106 within the network. The peer network 120 may also include a first resolver 124-A, a second resolver 124-B, and a third resolver 124-C. Resolvers may process API calls and return results. In some implementations, the peer network 120 may comprise a mesh network. A mesh network architecture may allow nodes to communicate directly with each other without relying on a central hub. This structure may enhance network resilience and eliminate single points of failure. The peer network 120 may utilize a Remote Procedure Call (RPC) architectural style. RPC may enable the execution of procedures on remote systems as if they were local calls. This architectural approach may facilitate communication between distributed components of the system. By combining a blockchain network 110 for registration and payments with a decentralized peer network 120 for handling API calls, the system may provide a robust infrastructure for decentralized applications. This architecture may enable secure, scalable, and censorship-resistant interactions between users and decentralized services.

As noted above, in some implementations, the user 102 may interact with the decentralized application 104 to initiate the user request 106. The decentralized application 104 may be a software application that operates on a decentralized network rather than a single computer. The decentralized application 104 may provide an interface for the user 102 to input data, select options, or trigger actions that result in API calls.

Users may be able to initiate API calls or requests through the dApps 104 (e.g., lightweight Web3 applications). User request 106 refers to a specific action initiated within a dApp 104, which can encompass submitting a transaction, accessing or updating data, or engaging in other activities depending on the dApp 104 functionality. In some implementations, the user 102 signs the request 106 via an off-chain payment channel with a unique payment signature. This signature outlines the maximum amount the user will pay for their request 106 (e.g., $0.0001 max).

Relayers, acting as traditional proxies, help in transmitting user-initiated requests 106 (e.g., API calls). In some implementations, the relayer acts as a proxy, transmitting the request to multiple resolvers without decrypting its content and ensuring that responses follow the reverse path back to the users 102. This process maintains user anonymity and ensures that relayers cannot tamper with or view sensitive request data. In some embodiments, upon receiving an encrypted RPC request 106 from a user 102, the relayers forward the message to the appropriate resolver or set of resolvers based on the payment and service requirements. In some embodiments, relayers must register through a Relayer Registration DAO Smart Contract 112. This registration process is critical for maintain an organized and centralized directory of all the relayers within the P2P Network infrastructure.

In some implementations, resolvers, the core of the network, perform computations and provide the requested data, thus completing the interaction cycle. More specifically, resolvers are specialized nodes with the role of securely processing and responding to user requests with the same level of encryption. They operate without revealing their identities to the network participants and only reveal their public keys to users for encrypting requests. This setup minimizes the risk of targeted attacks against specific resolvers.

Thus, in the decentralized system for handling API calls, relayers and resolvers process and route requests across the peer network. Relayers act as intermediaries within the network, receiving encrypted API requests from user devices and forwarding them to appropriate resolver nodes without decrypting or modifying the contents. These relayer nodes form an essential part of the network infrastructure, facilitating the efficient transmission of requests and helping to maintain the decentralized nature of the system. They may employ various routing algorithms to determine the optimal path for forwarding requests, considering factors such as network congestion, node availability, and geographical proximity. Relayers may also participate in load balancing, distributing incoming requests across multiple resolver nodes to prevent bottlenecks and ensure efficient processing. Additionally, relayers may be responsible for maintaining connections with multiple nodes in the network, continuously updating their routing tables, and potentially implementing caching mechanisms to improve response times for frequently requested data.

Resolvers, on the other hand, are responsible for processing the API requests and generating responses. Upon receiving an encrypted request from a relayer, a resolver node first decrypts the message using its private key. The resolver then interprets the API call, executes the requested operation, and generates an appropriate response. This process may involve interacting with external data sources, performing complex computations, or accessing blockchain-based smart contracts, depending on the nature of the API call. Resolvers may also participate in consensus mechanisms to validate the accuracy of API call results, potentially forming validation groups with other resolver nodes to ensure the integrity of the response. In some implementations, resolvers may be specialized for handling specific types of API calls or may have access to particular resources or data sets. They may also implement caching strategies to store frequently accessed data and reduce processing time for subsequent similar requests. After generating and potentially validating the API response, the resolver encrypts the result and sends it back through the peer network, potentially traversing one or more relayer nodes before reaching the original user device. Throughout this process, resolvers may also interact with blockchain-based smart contracts for various purposes, such as recording transaction details, managing micropayments, or updating network state information.

The P2P Network can be utilized as a resourceful foundation for a multitude of Web3 applications by providing a decentralized infrastructure for service requests and data retrieval. An example of a dApp that can be built on top of such a P2P Network is a wallet balance aggregator, and the network offers services to retrieve aggregated token balances from users' wallets across multiple chains. This functionality can provide users with comprehensive insights into their cryptocurrency holdings, facilitating informed decision-making and strategic asset allocation. Another example of a dApp that can be built on top of such a P2P Network is a limit order service, and resolvers can host decentralized order books tailored for limit orders, offering flexible trade management for both market makers and market takers.

In some implementations, another element of the system is the Software Development Kit (SDK) with a modular design that will allow developers to use only the components they need for their specific application. This comprehensive toolkit streamlines the process of connecting dApps to the P2P Network.

Figure 2:
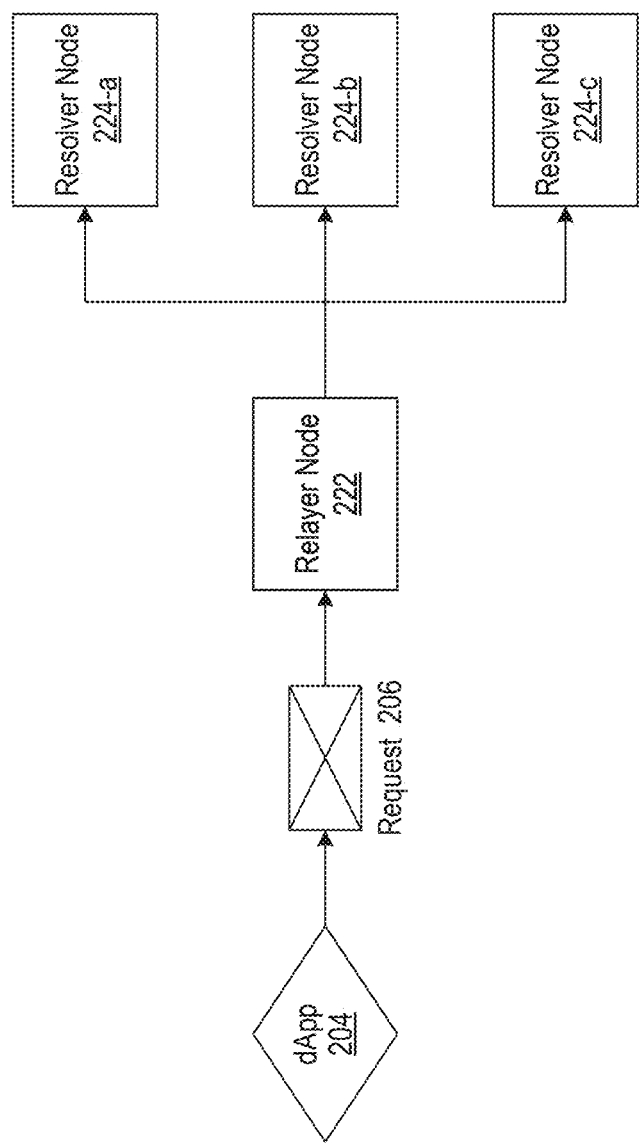
FIG. 2 illustrates a simplified overview of handling an API call in a decentralized manner using a P2P network.

FIG. 2 illustrates a simplified overview of handling an API call in a decentralized manner using a P2P network. In the process of forwarding a user request 206, the dApp 204 initially sends a request 206 to the target relayer node 222, responsible for validating the dApp payment status. The message sent is an RPC API request, which may be encrypted with the public key(s) of the resolver node(s) that are selected through the dApp.

In some embodiments, a user may have the option of selecting one or more resolver nodes in the dApp 204, which will include the public key(s) associated with the selected resolver node(s) in the message. For example, a user may select multiple resolver nodes (e.g., resolver nodes 224-A, 224-B, and 224-C), and the dApp 204 may include the public keys for those resolver nodes in the message. Subsequently, the relayer node 222 may forward the message to the resolver nodes that they are aware of from the original request.

Figure 3:
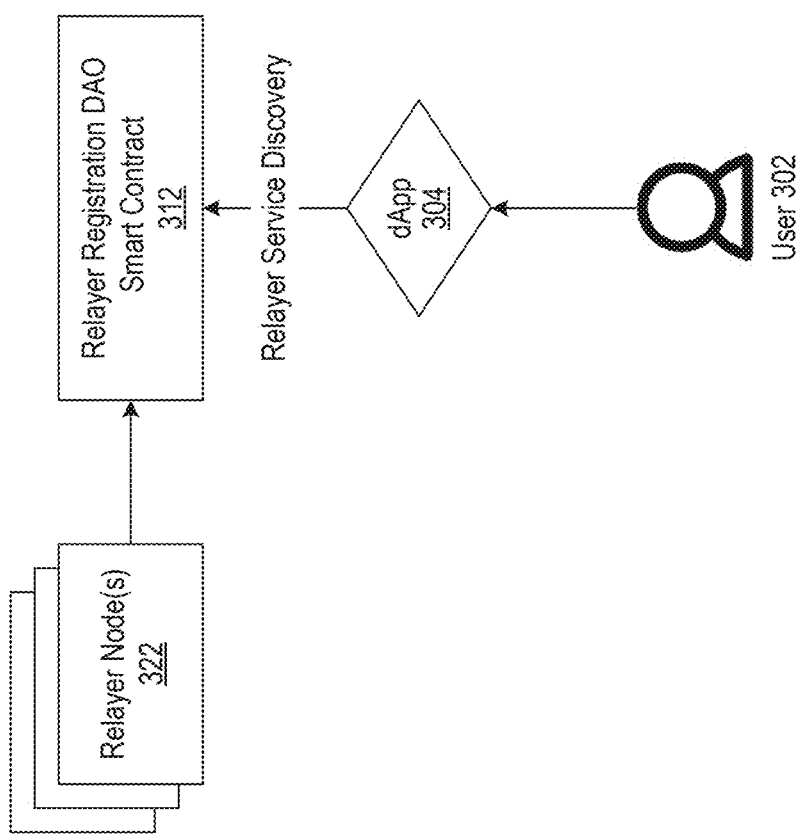
FIG. 3 illustrates a simplified overview of the registration of relayer nodes.

FIG. 3 illustrates a simplified overview of the registration of relayer nodes 322. As previously mentioned, in some implementations, relayers 322 must register through a Relayer Registration DAO Smart Contract. This registration process is critical for maintaining an organized and centralized directory of all the relayers within the P2P network infrastructure. Unregistering from the smart contract removes the relayer from the pool, ensuring that the list of active relayers is always up-to-date and resistant to Sybil attacks.

In some embodiments, there may be an incentive structure in place for the relayers. For example, relayers may be incentivized to forward messages (e.g., to resolvers) efficiently as they receive a fee for the successful transactions they facilitate.

Accordingly, the figure illustrates relayers 322 registering through the Relayer Registration DAO Smart Contract 312, providing details such as their IP addresses, service capabilities, and any additional metadata. To ensure maximum privacy, the relayers 322 may not reveal any information about the users or resolvers to which the relayers 322 connect. Instead, they operate as transparent and neutral proxies within the network.

Once a user 302 sends a request through a client like a dApp 304, the dApp 304 queries the smart contract 312 to select the available relayers 322 based on factors like load, latency, etc. After selection, communication with the chosen relayer is established using the discovered information.

Figure 4:
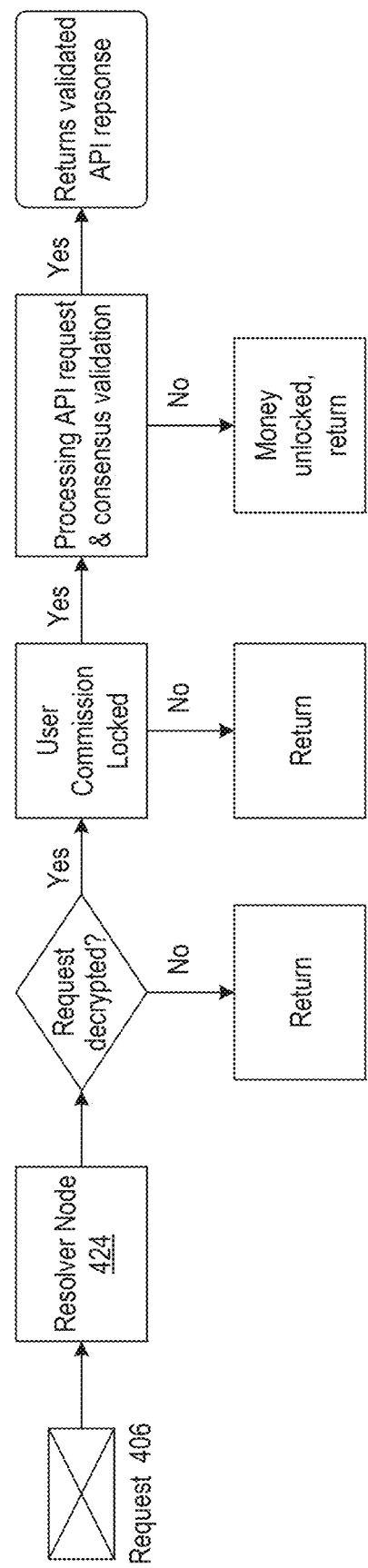
FIG. 4 illustrates a simplified overview of a resolver node receiving and processing a user request.

FIG. 4 illustrates a simplified overview of a resolver node receiving and processing a user request. As previously mentioned, resolvers are specialized nodes with the role of securely processing and responding to user requests with the same level of encryption. They operate without revealing their identities to the network participants and only reveal their public keys to users for encrypting requests. Resolvers are then able to receive user requests and decrypt them using their private keys. This setup minimizes the risk of targeted attacks against specific resolvers.

In some embodiments, just like relayers, resolvers may need to register with the Relayer Registration DAO Smart Contract to become part of the network. In some embodiments, there may be an additional screening or selection process that can be used to determine which resolvers are whitelisted. For example, on the 1 inch network, the community may be able to govern the selection of top resolvers through a staking mechanism where token holders can delegate their voting power by acquiring influence or "power" within the ecosystem. This process ensures that only the most trusted and high-performing resolvers are whitelisted, promoting a secure and reliable network. In some embodiments, there may be an incentive structure in place for the resolvers. For example, resolvers may be incentivized to respond promptly and accurately to requests that meet their cost criteria, as their payment is contingent upon the delivery of the requested service. In some embodiments, resolvers may undergo rigorous Know Your Business (KYB) and Anti-Money Laundering (AML) checks to ensure that each resolver is a trustworthy actor within the network. Only verified resolvers may be eligible to receive rewards and/or incentives.

Accordingly, FIG. 4 illustrates a resolver node 424 receiving a user request 406 (e.g., forwarded by the relayer node), which the resolver node 424 may decrypt using its private key. If successful, the user's money may be locked in a smart contract, and a validation group may be formed that comprises a number of validator nodes. In some embodiments, a fixed number of resolvers may be selected as the validator nodes. The validator nodes may provide validation as part of a consensus mechanism. For example, the validator nodes, along with the target resolver 424, may process the API request. Each validator node may compare the result of the API request to the result of the API request obtained by the target resolver 424. If consensus is not reached, then the user's money may be unlocked and returned to the user. If consensus is reached, then the validated API response may be sent out to ultimately be returned to the client (e.g., dApp). For example, the validated API response may be sent to the specific relayer associated with the user request and that relayer will forward the response to the user's client, ensuring accurate and targeted communication.

In some embodiments, the consensus process is essential for verifying the accuracy and authenticity of the tasks executed by resolver nodes. It acts as a system of checks and balances, ensuring group validator nodes agree on a common value or decision, even in scenarios where some nodes may fail or behave maliciously. The consensus mechanism is designed to ensure that all network participants can trust the results provided by the resolvers.

In some implementations, the consensus mechanism may implement an algorithm that uses a validator abstraction and an API result broadcast communication abstraction. Processes in the system carry out sequential rounds and track the proposed values they have encountered. A process refers to a requested API endpoint execution result validation, and a set of proposed values is what dApp/users specify when processing an API request. Initially, this set consists of its own proposal but expands as new proposed values are encountered in subsequent rounds. In some implementations, in each round, every process disseminates its proposal set in a proposal message to all processes using the best-effort broadcast abstraction. This means that the process floods the validators with all proposals it has seen in previous rounds.

The proposed value is only known to the process and is not shared with other processes. This request initiates broadcast events where processes share their proposed values with validator nodes. The goal is to reach an agreement where all correct processes decide on the same value. This is achieved through a decide indication that carries a value v and is processed as a <validate|v> event. An example consensus algorithm is included below for exemplary purposes:

```
Consensus, instance c.
Uses:
    ApiResultBroadcast, instance arb;
    ApiResultValidator, instance P.
upon event <c, Init> do
    correct := Π;
    round := 1;
    decision := ⊥;
    receivedfrom := [ Ø]N;
    proposals := [ Ø]N ;
    receivedfrom [0] := Π;
upon event <P , Crash | p > do
    correct := correct \ {p};
upon event <c, Propose | v> do
    proposals[1] := proposals[1] ∪ {v};
    trigger beb, Broadcast | [ PROPOSAL, 1, proposals [1]] ;
    upon event beb, Deliver | p, [ PROPOSAL, r, ps] do
    receivedfrom [r] := receivedfrom[r] ∪ {p};
    proposals[r] := proposals[r] ∪ ps;
upon correct ⊆ receivedfrom [round] ∧ decision = ⊥ do
    if receivedfrom [round] = receivedfrom [round − 1] then
        decision := min (proposals[round]);
        trigger beb, Broadcast | [ VALIDATED, validation] ;
        trigger c, Validate | validation ;
    else
        round := round + 1;
        trigger beb, Broadcast | [ PROPOSAL, round, proposals[round − 1]] ;
upon event beb, Deliver | p, [ VALIDATED, v] such that p ∈ correct ∧ decision = ⊥ do
    decision := v;
    trigger beb, Broadcast | [ VALIDATED , validation] ;
    trigger c, Validate | validation;
Module:
    Name: Consensus, instance c.
```

-continued

Events:
   Request: <c, Propose | v>: Proposes value v for consensus.
   Indication: <c, Validate | v>: Outputs a decided value v of consensus.
Properties:
   C1: Termination: Every correct process eventually decides some value.
   C2: Validity: If a process validates v, then v was proposed by some process.
   C3: Integrity: No process validates twice.
   C4: Agreement: No two correct processes validate differently.

Figure 5:
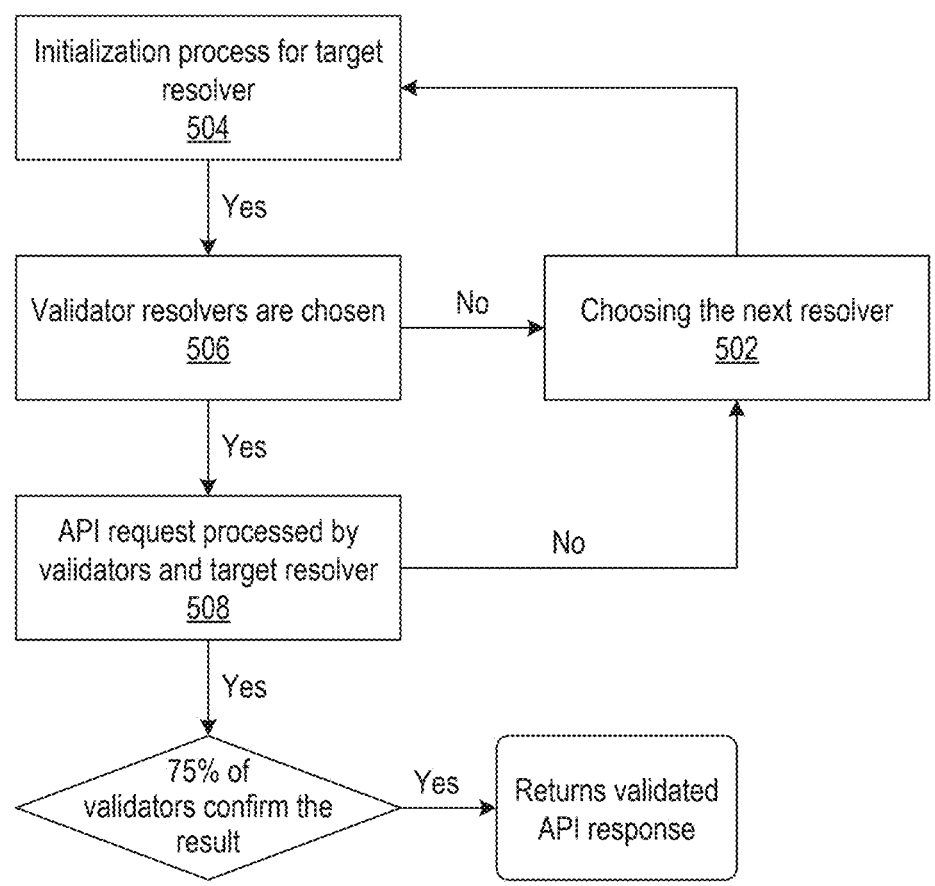
FIG. 5 illustrates a simplified overview of a consensus workflow associated with a consensus mechanism that can be used by the P2P network.

FIG. 5 illustrates a simplified overview of a consensus workflow associated with a consensus mechanism that can be used by the P2P Network. As previously mentioned, there may be a consensus mechanism implemented by the P2P network used to handle API calls. In some implementations, the process of achieving consensus in the P2P Network may involve several key mechanisms and stages, such as: initialization; proposal and broadcasting; validation-making; handling node failures; and validation and finalization.

During initialization, the initial parameters may be set (e.g., including the round number and decision status) and the network may be prepared for the consensus process. During proposal and broadcasting, nodes may propose values based on their tasks and broadcast these proposals across the network for consideration and validation. During validation-making, there may be a mechanism involving a series of rounds where nodes exchange proposed values. A decision may be reached when a node gathers all proposals that any correct node could see in the network. Once a decision is reached, the decision may be validated and finalized, ensuring that all nodes in the network acknowledge and agree upon the outcome. Handling of node failures may involve a mechanism that accounts for potential node crashes by updating the network understanding of which nodes function correctly.

Figure 6:
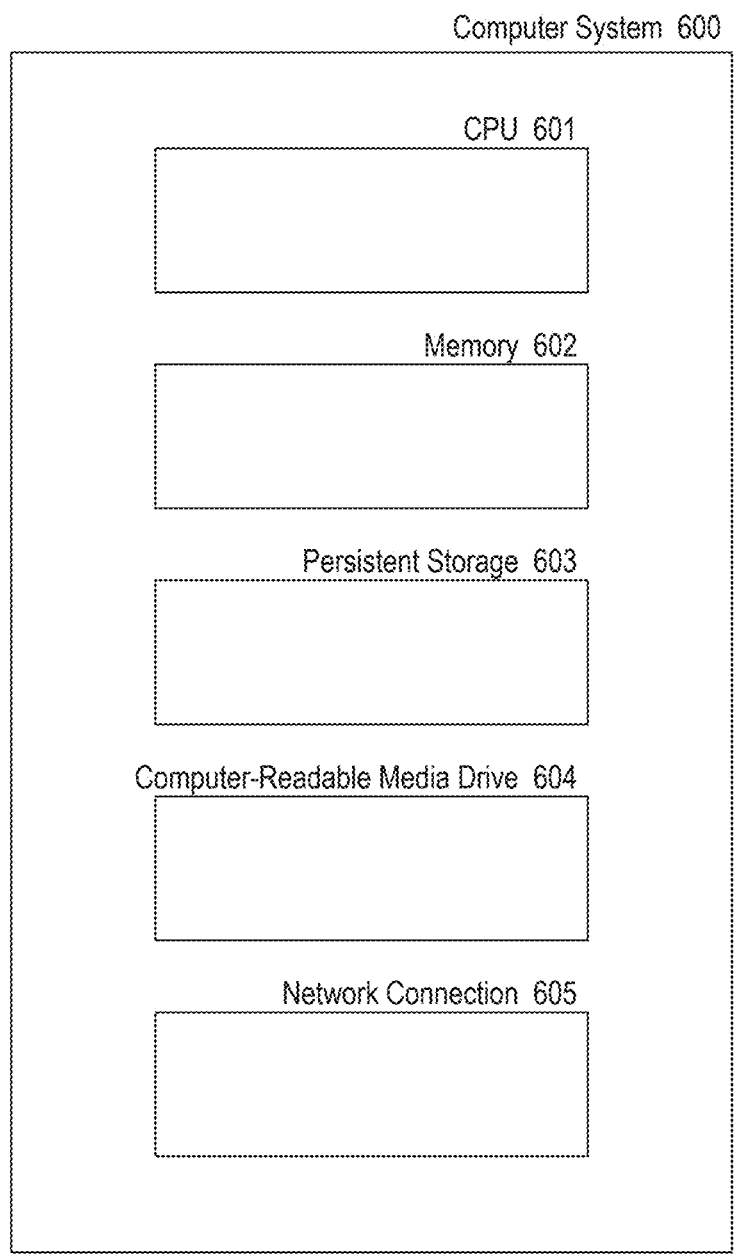
FIG. 6 is a system diagram illustrating an example of a computing environment in which the disclosed system operates in some embodiments of the present technology.

Accordingly, FIG. 6 illustrates at block 502, a resolver may be chosen and selected for validation using the consensus process (e.g., the target resolver that received an API request). At block 504, initialization may be performed for the target resolver and the network may be prepared for the consensus process. At block 506, a set of validator nodes or validator resolvers may be chosen for the consensus process. At block 508, the API request may be processed to obtain an API response by the validator resolvers and the target resolver. If a number of validators confirm the result obtained by the target resolver, or if a threshold number of validators confirm the result obtained by the target resolver (e.g., 75% of the validators confirm the result), then the validated API response may be returned to the user's client (e.g., the dApp) that issued the API request.

In some implementations, there may be various approaches for implementing communications in the P2P network. Regarding data transmission, in some implementations, libp2p's P2P communication stack may be used to exchange information privately without a trusted third party or intermediary. In some embodiments, WebRTC and WebTransport may be used as the underlying transport protocols for transmitting data, which are readily available and supported by libp2p. In some implementations, dApps may be able to connect to nodes of the P2P network using WebRTC and WebTransport. In some implementations, the connectivity process encompasses several stages including setup, maintenance, and termination. During setup, the initial connection may be established between the dApp and the network nodes. During maintenance, a stable and efficient communication channel may be sustained throughout the interaction between the dApp and the network nodes. During termination, the communication channel may be properly closed once the interaction is complete or no longer needed.

In some implementations, all data transmitted within the network, including communication between dApps, users, relayers, and resolvers, may be encrypted end-to-end. In some implementations, encryption may be achieved using asymmetric cryptography, where data encrypted with a public key can only be decrypted by the corresponding private key, such that only intended recipients can access the information. When a user initiates a request, it may be encrypted with the public key of the potential resolver. Only the selected resolver with the corresponding private key can decrypt and process the request. Thus, sensitive data is unreadable by intermediaries, such as relayers or malicious actors who might intercept the communication. In some implementations, proxy re-encryption may be used, allowing data to be securely shared between different parties. Proxy re-encryption involves transforming encrypted data into a new encrypted format that can be decrypted only by the recipient's (resolver's) private key. The data remains encrypted during transit.

In some implementations, there may be governance and incentive mechanisms in place for the various nodes of the network. For example, on the P2P network, the community (e.g., participants of the DAO) may be able to participate and make decisions associated with governance and the development of the P2P network. For instance, holders of a specific token may be able to assign their influence and/or tower to endorse resolvers, such that the most reliable and top-performing resolvers are whitelisted and incentivized to maintain high-quality service standards.

In some implementations, transactions for services may be conducted through off-chain payment channels: two-way pathways between two parties. These channels may enable high transaction throughput and ensure that payment details remain confidential and are only known between the user and the resolver. This preserves financial privacy and reduces on-chain bloat, leading to lower fees and faster settlements. In some implementations, there may be a user-directed payment cap with Dutch auction mechanics. For example, on the P2P network, there may be a refined payment mechanism for handling transactions tied to RPC calls, employing a Dutch auction model with millisecond precision. To adhere to precise Dutch auction timing, each RPC request may be embedded with a user-signed payment signature indicating the moment the auction commences, accompanied by a user-defined maximum price cap for the transaction. Following the timestamp, the resolver's potential compensation increases with each passing millisecond, adding urgency to the transaction processing. For example, an RPC call requesting an ETH wallet balance from the Ethereum network has an expected completion threshold of under one second. Within this window, specifically the first 500 milliseconds, the resolver's remuneration rises progressively until it hits the user's maximum price threshold. This design incentivizes resolvers to prioritize and quickly process requests, capitalizing on the rising remuneration leading to the user's payment ceiling.

In some implementations, there may also be mechanisms for ensuring cost control and timely services. Users may be protected from overpaying as the cost will not surpass the predetermined maximum limit. Resolvers undertaking the RPC calls must fulfill the request within the time frame, such that users are not charged beyond their set limit.

In some implementations, the system may comprise mechanisms for transaction finalization and payment processing. The execution and settlement of payments may transpire as follows. The moment a resolver commits to an RPC call, the Dutch auction for that request is concluded. The remuneration may be set at or below the maximum limit based on the lock-in timing. The resolver is guaranteed the auction-determined remuneration upon the successful and timely execution of the RPC call.

Thus, the system ensures that users receive prompt service, while relayers and resolvers are incentivized for their swift and efficient marketplace responses. By integrating this nuanced Dutch auction approach with off-chain payment channels, the P2P Network comprises a user-focused, equitable, and transparent process for managing and prioritizing user requests, maintaining an equilibrium between user costs and the motivation for resolvers.

FIG. 6 is a block diagram showing some of the components typically incorporated in at least some of the computer systems and other devices on which the disclosed system operates. In various embodiments, these computer systems, and other devices 600 can include server computer systems, desktop computer systems, laptop computer systems, netbooks, mobile phones, personal digital assistants, televisions, cameras, automobile computers, electronic media players, etc. In various embodiments, the computer systems and devices include zero or more of each of the following: a central processing unit (CPU) 601 for executing computer programs; a computer memory 602 for storing programs and data while they are being used, including the facility and associated data, an operating system including a kernel, and device drivers; a persistent storage device 603, such as a hard drive or flash drive for persistently storing programs and data; computer-readable media drives 604 that are tangible storage means that do not include a transitory, propagating signal, such as a floppy, CD-ROM, or DVD drive, for reading programs and data stored on a computer-readable medium; and a network connection 605 for connecting the computer system to other computer systems to send and/or receive data, such as via the Internet or another network and its networking hardware, such as switches, routers, repeaters, electrical cables and optical fibers, light emitters and receivers, radio transmitters and receivers, and the like. While computer systems configured as described above are typically used to support the operation of the facility, those skilled in the art will appreciate that the facility may be implemented using devices of various types and configurations and having various components.

Figure 7:
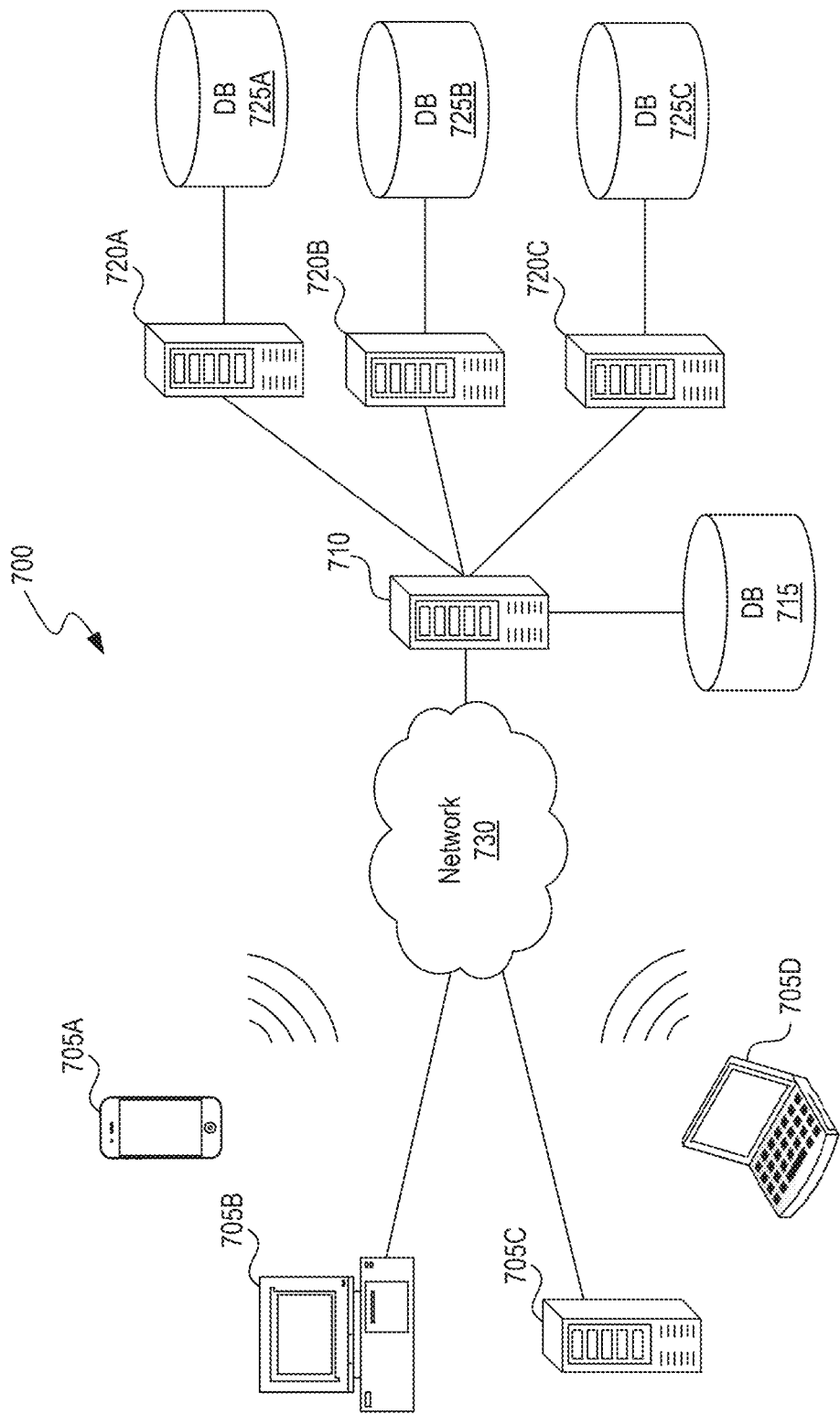
FIG. 7 is a system diagram illustrating an example of a computing environment in which the disclosed system operates in some embodiments.

FIG. 7 is a system diagram illustrating an example of a computing environment in which the disclosed system operates in some embodiments. In some embodiments, environment 700 includes one or more client computing devices 705A-D, examples of which can host the system. Client computing devices 705 operate in a networked environment using logical connections through network 730 to one or more remote computers, such as a server computing device.

In some implementations, server 710 is an edge server which receives client requests and coordinates fulfillment of those requests through other servers, such as servers 720A-C. In some embodiments, server computing devices 710 and 720 comprise computing systems, such as the system. Though each server computing device 710 and 720 is displayed logically as a single server, server computing devices can each be a distributed computing environment encompassing multiple computing devices located at the same or at geographically disparate physical locations. In some embodiments, each server 720 corresponds to a group of servers.

Client computing devices 705 and server computing devices 710 and 720 can each act as a server or client to other server or client devices. In some embodiments, servers (710, 720A-C) connect to a corresponding database (715, 725A-C). As discussed above, each server 720 can correspond to a group of servers, and each of these servers can share a database or can have its own database. Databases 715 and 725 warehouse (e.g., store) information such as home information, recent sales, home attributes, and so on. Though databases 715 and 725 are displayed logically as single units, databases 715 and 725 can each be a distributed computing environment encompassing multiple computing devices, can be located within their corresponding server, or can be located at the same or at geographically disparate physical locations.

Network 730 can be a local area network (LAN) or a wide area network (WAN) but can also be other wired or wireless networks. In some embodiments, network 730 is the Internet or some other public or private network. Client computing devices 705 are connected to network 730 through a network interface, such as by wired or wireless communication. While the connections between server 710 and servers 720 are shown as separate connections, these connections can be any kind of local, wide area, wired, or wireless network, including network 730 or a separate public or private network.

Figure 8:
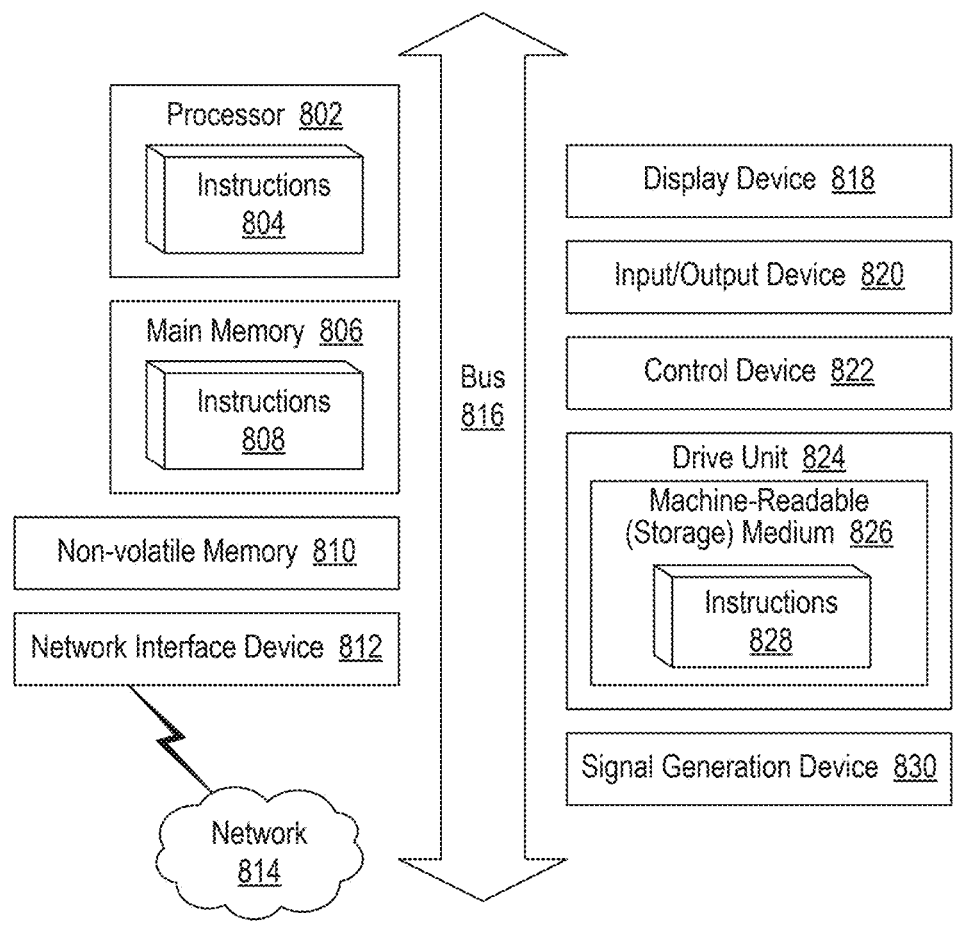
FIG. 8 is a block diagram that illustrates an example of a computer system in which at least some operations described herein can be implemented.

FIG. 8 is a block diagram that illustrates an example of a computer system 800 in which at least some operations described herein can be implemented. As shown, the computer system 800 can include: one or more processors 802, main memory 806, non-volatile memory 810, a network interface device 812, a video display device 818, an input/output device 820, a control device 822 (e.g., keyboard and pointing device), a drive unit 824 that includes a machine-readable (storage) medium 826, and a signal generation device 830 that are communicatively connected to a bus 816. The bus 816 represents one or more physical buses and/or point-to-point connections that are connected by appropriate bridges, adapters, or controllers. Various common components (e.g., cache memory) are omitted from FIG. 8 for brevity. Instead, the computer system 800 is intended to illustrate a hardware device on which components illustrated or described relative to the examples of the figures and any other components described in this specification can be implemented.

The computer system 800 can take any suitable physical form. For example, the computing system 800 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 800. In some implementations, the computer system 800 can be an embedded computer system, a system-on-chip (SOC), a single-board computer system (SBC), or a distributed system such as a mesh of computer systems, or it can include one or more cloud components in one or more networks. Where appropriate, one or more computer systems 800 can perform operations in real time, in near real time, or in batch mode.

The network interface device 812 enables the computing system 800 to mediate data in a network 814 with an entity that is external to the computing system 800 through any communication protocol supported by the computing system 800 and the external entity. Examples of the network interface device 812 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 806, non-volatile memory 810, machine-readable medium 826) can be local, remote, or distributed. Although shown as a single medium, the machine-readable medium 826 can include multiple media (e.g., a centralized/distributed database and/or associated caches and servers) that store one or more sets of instructions 828. The machine-readable medium 826 can include any medium that is capable of storing, encoding, or carrying a set of instructions for execution by the computing system 800. The machine-readable medium 826 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 810, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 804, 808, 828) set at various times in various memory and storage devices in computing device(s). When read and executed by the processor 802, the instruction(s) cause the computing system 800 to perform operations to execute elements involving the various aspects of the disclosure.

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

What is claimed is:

1. A system for generating a decentralized response to an application programming interface (API) call, the system comprising:
   a blockchain network comprising a relayer registration smart contract; and
   a peer-to-peer network comprising a plurality of nodes, wherein each of the plurality of nodes comprises a relayer or a resolver, each node comprising:
      at least one hardware processor; and
      at least one non-transitory memory storing instructions, which, when executed by the at least one hardware processor, cause the node to:
         for at least one relayer:
            register on the blockchain network using the relayer registration smart contract;
            receive, from a user via a decentralized application, an encrypted user request on the peer-to-peer network, the encrypted user request comprising an encrypted format of the API call that is generated using a public key of at least one resolver selected through the decentralized application;
            validate a payment status of the decentralized application;
            transmit, to the at least one resolver, the encrypted user request without decrypting the encrypted format of the API call of the encrypted user request;
            receive, from the at least one resolver, accessed data; and
            transmit the accessed data to the decentralized application; and
         for the at least one resolver:
            receive, from the at least one relayer, the encrypted user request comprising the encrypted format of the API call;
            decrypt the encrypted user request using a private key;
            process the API call to obtain a result;
            compare the obtained result to a second result obtained by at least one other resolver to reach a validation consensus;
            upon reaching the validation consensus, execute the API call to generate a response to the encrypted user request; and
            transmit, to the at least one relayer, the response to the encrypted user request.

2. The system of claim 1, wherein the peer-to-peer network comprises a mesh network.

3. The system of claim 1, wherein the peer-to-peer network comprises a Remote Procedure Call (RPC) architectural style.

4. The system of claim 1, wherein the relayer registration smart contract comprises a decentralized autonomous organization (DAO) smart contract.

5. The system of claim 1, wherein the encrypted user request is encrypted using asymmetric cryptography.

6. The system of claim 1, wherein reaching a validation consensus comprises using a flooding consensus algorithm.

7. A computer-implemented method for generation of a decentralized response to an application programming interface (API) call, the computer-implemented method comprising:
   registering at least one relayer of a plurality of relayers of a peer-to-peer network on a blockchain network using a relayer registration smart contract, wherein the peer-to-peer network comprises a plurality of nodes comprising the plurality of relayers and a plurality of resolvers;
   receiving, from a user via a decentralized application by the at least one relayer, an encrypted user request on the peer-to-peer network, the encrypted user request comprising an encrypted format of the API call that is generated using a public key of at least one resolver selected through the decentralized application;
   validating, by the at least one relayer, a payment status of the decentralized application;
   transmitting, by the at least one relayer to at least one resolver of the plurality of resolvers, the encrypted user request without decrypting the encrypted format of the API call of the encrypted user request;
   receiving, from the at least one relayer by the at least one resolver, the encrypted user request comprising the encrypted format of the API call;
   decrypting, by the at least one resolver, the encrypted user request using a private key;
   processing, by the at least one resolver, the API call to obtain a result;
   comparing, by the at least one resolver, the obtained result to a second result obtained by at least one other resolver to reach a validation consensus;
   upon reaching the validation consensus, executing, by the at least one resolver, the API call to generate a response to the encrypted user request;
   transmitting, by the at least one resolver to the at least one relayer, the response to the encrypted user request; and
   transmitting the response to the encrypted user request to the decentralized application, wherein the at least one relayer and the at least one resolver comprise a processor and a memory.

8. The method of claim 7, wherein the peer-to-peer network comprises a mesh network.

9. The method of claim 7, wherein the peer-to-peer network comprises a Remote Procedure Call (RPC) architectural style.

10. The method of claim 7, wherein the relayer registration smart contract comprises a decentralized autonomous organization (DAO) smart contract.

11. The method of claim 7, wherein the encrypted user request is encrypted using asymmetric cryptography.

12. The method of claim 7, wherein reaching a validation consensus comprises using a flooding consensus algorithm.

13. The method of claim 7, wherein executing the API call comprises executing a payment smart contract.

14. A non-transitory computer readable medium having stored thereon instructions for causing a processing circuitry to execute a process, the process comprising:
   registering at least one relayer of a plurality of relayers of a peer-to-peer network on a blockchain network using a relayer registration smart contract, wherein the peer-to-peer network comprises a plurality of nodes comprising the plurality of relayers and a plurality of resolvers;
   receiving, from a user via a decentralized application by the at least one relayer, an encrypted user request on the peer-to-peer network, the encrypted user request comprising an encrypted format of an application programming interface (API) call that is generated using a public key of at least one resolver selected through the decentralized application;
   validating, by the at least one relayer, a payment status of the decentralized application;
   transmitting, by the at least one relayer to at least one resolver of the plurality of resolvers, the encrypted user request without decrypting the encrypted format of the API call of the encrypted user request;
   receiving, from the at least one relayer by the at least one resolver, the encrypted user request comprising the encrypted format of the API call;
   decrypting, by the at least one resolver, the encrypted user request using a private key;
   processing, by the at least one resolver, the API call to obtain a result;
   comparing, by the at least one resolver, the obtained result to a second result obtained by at least one other resolver to reach a validation consensus;
   upon reaching the validation consensus, executing, by the at least one resolver, the API call to generate a response to the encrypted user request;
   transmitting, by the at least one resolver to the at least one relayer, the response to the encrypted user request; and
   transmitting the response to the encrypted user request to the decentralized application, wherein the at least one relayer and the at least one resolver comprise a processor and a memory.

15. The non-transitory computer readable medium of claim 14, wherein the peer-to-peer network comprises a mesh network.

16. The non-transitory computer readable medium of claim 14, wherein the peer-to-peer network comprises a Remote Procedure Call (RPC) architectural style.

17. The non-transitory computer readable medium of claim 14, wherein the relayer registration smart contract comprises a decentralized autonomous organization (DAO) smart contract.

18. The non-transitory computer readable medium of claim 14, wherein the encrypted user request is encrypted using asymmetric cryptography.

19. The non-transitory computer readable medium of claim 14, wherein reaching a validation consensus comprises using a flooding consensus algorithm.

20. The non-transitory computer readable medium of claim 14, wherein executing the API call comprises executing a payment smart contract.

* * * * *